(12) United States Patent
LaDow

(10) Patent No.: US 6,457,444 B1
(45) Date of Patent: Oct. 1, 2002

(54) POLY VALVE SYSTEM FOR INTERNAL COMBUSTION ENGINES HAVING NON-PARALLEL VALVE ARRANGEMENT

(76) Inventor: Ron LaDow, 283 Connecticut St., San Francisco, CA (US) 94107

( * ) Notice: Subject to any disclaimer, the term of this patent is extended or adjusted under 35 U.S.C. 154(b) by 0 days.

(21) Appl. No.: 09/933,394

(22) Filed: Aug. 20, 2001

Related U.S. Application Data

(63) Continuation-in-part of application No. 09/791,291, filed on Feb. 23, 2001, which is a continuation of application No. 09/312,032, filed on May 14, 1999, now abandoned.

(51) Int. Cl.[7] ............................. F01L 9/04; F02M 35/10
(52) U.S. Cl. .................... 123/90.11; 123/308; 123/315; 123/432
(58) Field of Search .................... 123/90.11, 90.12, 123/90.14, 90.27, 308, 315, 432

(56) References Cited

U.S. PATENT DOCUMENTS

| | | | |
|---|---|---|---|
| 2,005,089 A | 6/1935 | Krebs | 123/90.65 |
| 2,072,437 A | 3/1937 | Wuetele | 123/90.12 |
| 2,126,885 A | 8/1938 | Heintz | 123/90.12 |
| 4,256,068 A | 3/1981 | Irmajiri et al. | 123/432 |
| 4,515,343 A | 5/1985 | Pischinger et al. | 123/90.11 |
| 4,587,936 A | 5/1986 | Matsuura et al. | 123/90.12 |
| 4,593,657 A | 6/1986 | Aoi | 123/90.6 |
| 4,617,881 A | 10/1986 | Aoi | 123/90.27 |
| 4,658,780 A | 4/1987 | Hodoi | |
| 4,660,529 A | 4/1987 | Yoshikawa | 123/432 |
| 4,766,866 A | 8/1988 | Takii et al. | 123/432 |
| 4,870,930 A | 10/1989 | Yagi | 123/90.11 |
| 5,007,387 A | 4/1991 | Arao | 123/90.22 |
| 5,018,497 A * | 5/1991 | Tsuchida | 123/432 |
| 5,022,357 A | 6/1991 | Kawamura | 123/90.11 |
| 5,094,197 A | 3/1992 | Rosa | 123/90.27 |
| 5,095,858 A | 3/1992 | Ascari | 123/90.27 |
| 5,111,791 A | 5/1992 | Onodera | |
| 5,163,390 A | 11/1992 | Shimamoto | 123/432 |
| 5,184,580 A | 2/1993 | Ascari | 123/90.27 |
| 5,375,568 A | 12/1994 | Manolis | |
| 5,669,341 A | 9/1997 | Ushirono | 123/90.12 |
| 5,868,113 A | 2/1999 | Yoshikawa | 123/308 |
| 6,055,958 A * | 5/2000 | Aoyama et al. | 123/308 |
| 6,070,853 A * | 6/2000 | Stolk et al. | 251/129.18 |
| 6,076,490 A * | 6/2000 | Esch et al. | 123/90.11 |
| 6,148,778 A | 11/2000 | Sturman | 123/90.12 |
| 6,176,208 B1 * | 1/2001 | Tsuzuki et al | 123/90.11 |

* cited by examiner

*Primary Examiner*—Weilun Lo
(74) *Attorney, Agent, or Firm*—Goldstein & Lavas, P.C.

(57) ABSTRACT

A poly valve system for an internal combustion engine having at least one cylinder having a bore and a cylinder center line, a piston capable of reciprocal travel within the bore, a cylinder head adjacent the bore having a hemispherical cylinder roof, intake and exhaust manifolds, and a combustion chamber defined between the cylinder head and the piston, comprising a plurality of independently operated valves. Valve seats comprise openings in the cylinder head between one of the manifolds and the combustion chamber. Poppet valves are situated in the valve seats to selectively allow communication between one of the manifolds and the combustion chamber. The valves are independently operable by a control signal, are non-parallel, and are oriented toward the cylinder center line.

11 Claims, 8 Drawing Sheets

POLY VALVE SYSTEM FOR INTERNAL COMBUSTION ENGINES HAVING NON-PARALLEL VALVE ARRANGEMENT

CROSS REFERENCES AND RELATED SUBJECT MATTER

This application is a continuation-in-part of patent application Ser. No. 09/791,291, filed in the United States Patent office on Feb. 23, 2001, which is a continuation of patent application Ser. No. 09/312,032, filed in the United States Patent office on May 14, 1999, now abandoned.

BACKGROUND OF THE INVENTION

The invention relates to a poly valve system for internal combustion engines having non-parallel valve placement. More particularly, the invention relates to a valve system which employs several independently operated intake valves and several independently operated exhaust valves per cylinder so that non-parallel valve arrangements can be achieved to maximize engine performance.

In an internal combustion engine, intake and exhaust valves serve a crucial function. They must each open at an appropriate time to allow combustible gases in or exhaust out, and remain tightly closed at all other times to maximize the power derived from combustion.

The performance of the engine is also closely linked to the valves. It is well known that the more an engine "breathes" the more power it will generate. This is known as "volumetric efficiency". It seems obvious that the more fuel and air that enters the combustion chamber, the greater the force of the explosion and the greater the power generated thereby. However, the ability of the engine to eliminate combustion by-products is also an important factor in performance. In fact the peak horsepower—the practical rev limit for an engine—is in large part determined by the speed at which the exhaust valves can no longer expel sufficient burned gases to allow efficient combustion to occur.

Traditionally, valve systems are fully mechanical systems. At least one cam shaft is used to precisely determine the times during the engine cycle when each valve is to be opened and closed. For each valve, a cam follower traces the movements of the cam shaft, and causes the valve "poppet" to open and close. One problem with this arrangement is the lack of flexibility. Once the cams are set, it is not possible to change the relative opening and closing times of the valves. In addition, the entire cam system itself comprises numerous moving parts which require maintenance and which to some extent detract power from the engine.

Over the last two decades, adding an extra intake and an extra exhaust valve per cylinder has become prevalent in automobile engines of all types. This change has thus lead to increased engine performance by simply increasing the inward and outward flow of the combustion chamber, and thus increasing the volumetric efficiency. In such engines, it has been the general practice to have both intake valves to open and close at the same time.

Experimentation with increasing the number of valves has revealed practical limitations. Having a large number of valves quickly increases the complexity of the cylinder head configuration, and causes porting problems. Some have sought to maximize the number of valves by conceiving variations of traditional cam operated valve technology.

Further, in a multi-valve system it would be desirable to orient the valves toward the cylinder center line. However, traditional valve operating technology the limits valve angle within the cylinder head, such that valves must be parallel to operate from the same cam shaft. Unfortunately, the use of non-parallel valves would help maximize engine performance.

The most thermally efficient chamber has a hemispherical chamber "roof". Unfortunately with the limitations for valve placement discussed above, only one intake and one exhaust valve could be used with a hemispherical chamber. In particular, using existing technology, duplicative valves must remain parallel. Parallel valves will not work with a hemispherical chamber using traditional valve operating technology. Thus in a thermally efficient hemispherical chamber, volumetric efficiency cannot be optimized.

In one early attempt, following World War II, an AJS motorcycle known as "the porcupine" attempted to use two non-parallel intake valves and two non-parallel exhaust valves. This design failed miserably because the use of conventional cam-based opening technology was unsuitable for reliably opening non-parallel valves.

U.S. Pat. No. 5,375,568 to Manolis et al. discloses a multi-valve internal combustion engine which has a cluster valve system, wherein four intake valves are mechanically ganged and all operate off a common cam follower. Four exhaust valves are also provided in a similar arrangement.

U.S. Pat. No. 5,111,791 to Onodera discloses a cylinder head and valve train arrangement for a multiple valve engine. Onodera discloses a six valve arrangement, wherein special attention has been given to solving the problem of positioning and synchronizing cam shafts to operate these valves. Care is taken to carefully synchronize the opening of all four intake valves even though two separate cam shafts are used for opening these valves.

U.S. Pat. No. 4,658,780 to Hosoi; U.S. Pat. No. 5,007,387 to Arao; U.S. Pat. No. 5,094,197 to Rosa; and U.S. Pat. No. 5,184,580 to Ascari all disclose multiple intake and exhaust valve systems. These patent references are all concerned with working out the mechanics of a multi-valve system using existing cam operated valves. They are generally concerned with synchronizing the valves where the use of multiple valves conflicts with the ordinary design constraints of standard single cam valve operation.

U.S. Pat. No. 4,587,936 to Matsuura et al. discloses a valve control system which employs traditional cam-based valve opening. Matsuura has provisions to mechanically deactivate one of the intake valves under certain engine conditions. However Matsuura is not able to provide any other flexibility or control over valve opening or timing, other than being able to simply disable one of the valves.

U.S. Pat. No. 5,669,341 to Ushirono et al. discloses a valve operating system which uses an electrically operated valve in addition to a mechanically operated valve. However, Ushirono et al. only employs the electrically operated valve during certain engine conditions.

While these units may be suitable for the particular purpose employed, or for general use, they would not be as suitable for the purposes of the present invention as disclosed hereafter. In particular, these multiple valve systems all seek to employ a modified mechanical cam-based opening system. They are generally concerned with ensuring that all intake valves open together. However, some study has revealed that carefully creating turbulence in the combustion chamber can increase engine performance. But, the prior art systems are unsuitable for experimentation to optimize such effects, because they do not allow independent operation or opening timing between the various intake valves. In addition, internal stresses generated by the cam system inertia in itself limits rev speeds that the engine can achieve. Further because they employ traditional valve opening technology, they cannot take advantage of the freedom on non-parallel valve positioning.

SUMMARY OF THE INVENTION

It is a primary object of the invention to simultaneously maximize both thermal and volumetric efficiency. Accordingly, the invention seeks to allow multiple intake and exhaust valves in a hemispherical chamber design. Thus, the independent valve technology of the present invention allows non-parallel valve placement within a hemispherical chamber.

It is an object of the invention to increase the performance of an internal combustion engine. Accordingly, the invention is a poly valve system which employs several intake and several exhaust valves per cylinder.

It is another object of the invention to provide multiple valves per cylinder without requiring a complex cylinder head configuration. Accordingly, the poly valve system eliminates the cam structure ordinarily required in four stroke engines.

It is yet another object of the invention to create turbulence within the cylinder during the intake cycle. Accordingly, fully independent valve operation and freedom of valve placement allow the effects of intake turbulence to be optimized.

It is a further object of the invention to greatly increase the revolution limit of the engine. Accordingly, the use of multiple valves, and the lack of reliance on a mechanical system to open and close the valves greatly increases the allowable rotary speed for the engine. In addition, the lower mass and complexity of the poly valve system allows greater speeds to be achieved.

It is a still further object of the invention that practically random valve operation is achievable. Accordingly, electric, hydraulic, or pneumatic valves may be employed so that fully random selection of opening and closing times can be determined and executed in accordance with achieving maximum efficiency.

It is yet a further object of the invention to reduce the overall size of the engine. Accordingly, by eliminating standard camming mechanisms, a significant space savings can be achieved.

It is a still further object of the invention to optimize the shape of the combustion chamber. Accordingly, by having the ability to place numerous, smaller valves at flexible locations in the cylinder head, the piston need not be altered to provide valve clearance and thus can have a smoother shape.

The invention is a poly valve system for an internal combustion engine having at least one cylinder having a bore and a cylinder center line, a piston capable of reciprocal travel within the bore, a cylinder head adjacent the bore having a hemispherical cylinder roof, intake and exhaust manifolds, and a combustion chamber defined between the cylinder head and the piston, comprising a plurality of independently operated valves. Valve seats comprise openings in the cylinder head between one of the manifolds and the combustion chamber. Poppet valves are situated in the valve seats to selectively allow communication between one of the manifolds and the combustion chamber. The valves are independently operable by a control signal, may be non-parallel, and may be substantially oriented toward the cylinder center line.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

The following description begins with a discussion of technology suitable for independent valve operation. In particular, the discussion in conjunction with FIGS. 1, 2, 3, and 4 demonstrates valves in a cylinder head in which each valve is capable of operating fully independently from the others. This discussion is a prelude to the discussion in FIG. 5 through FIG. 15, which demonstrates how a non-parallel valve arrangement can finally be achieved by virtue of this independent valve technology.

Figure 1:
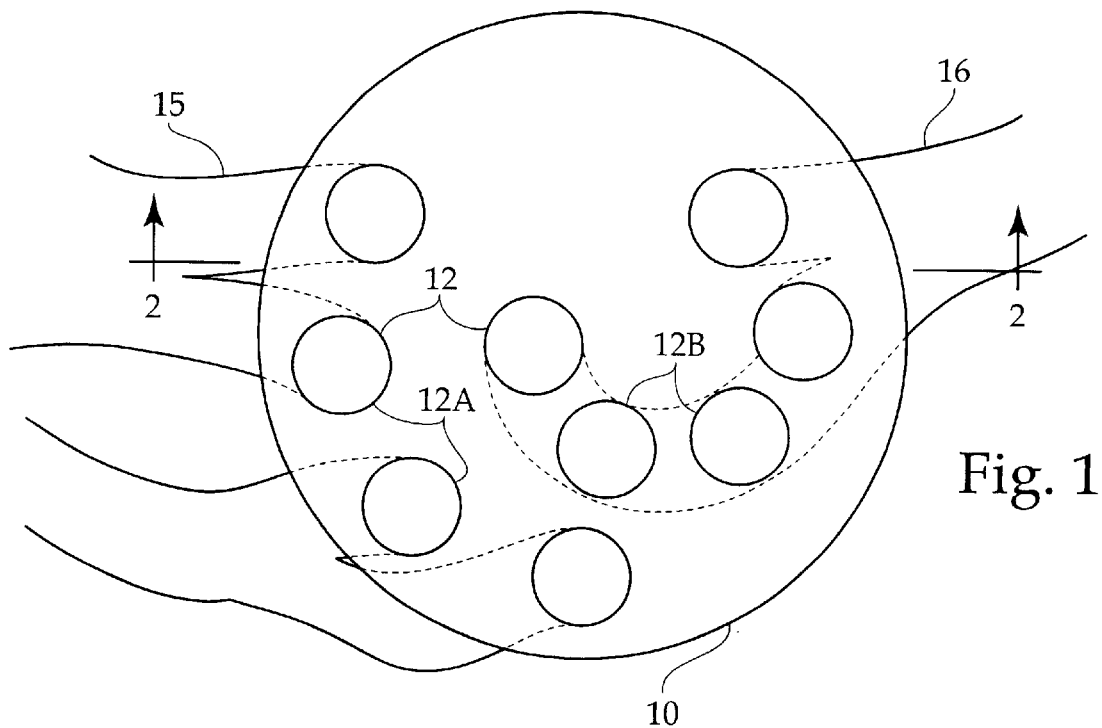
FIG. 1 is a diagrammatic top plan view, illustrating a portion of a cylinder head associated with one cylinder, indicating an exemplative valve placement which may be used in accordance with the present invention.

FIG. 1 diagrammatically illustrates a cylinder head 10 having a plurality of valve openings 12 depicted therein. The valves comprise intake valves 12A and exhaust valves 12B. An intake manifold 15 is in communication with the intake valves 12A, and an exhaust manifold 16 is in communication with the exhaust valves 12B.

Figure 2:
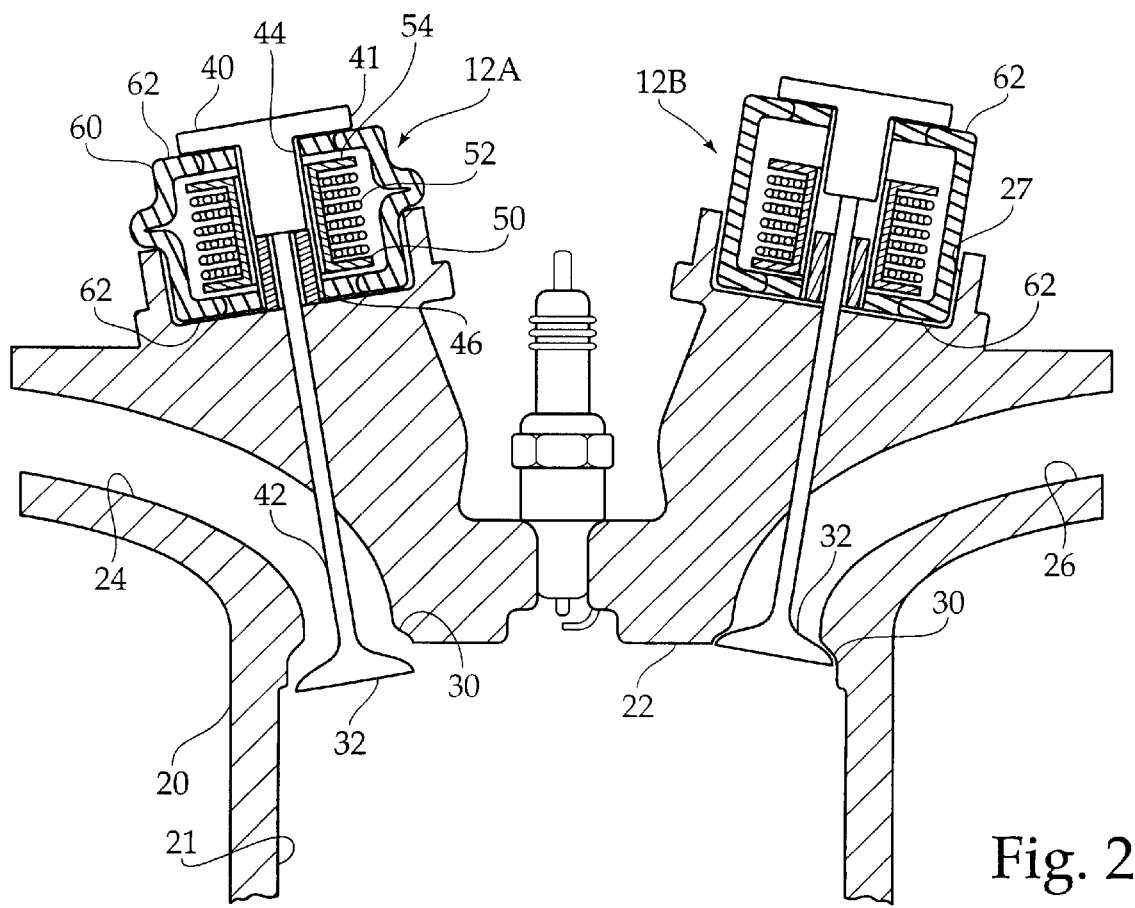
FIG. 2 is a cross sectional view of a cylinder having a simplified valve topology, wherein a pair of independently operable valves, wherein the valves are constructed according to an electrically operated embodiment of the invention.

FIG. 2 is a cross sectional view, which illustrates a cylinder 20. The cylinder 20 has a bore 21, through which a piston (not shown) reciprocates. A cylinder head 22 is located on top of the bore 21 toward and away from which the piston reciprocates. Together the bore 21, the cylinder head 22 and the piston define a combustion chamber. The cylinder head 22 includes an intake passageway 24 and an exhaust passageway 26, which form part of the intake and exhaust manifolds shown in FIG. 1. Both the intake passageway 24 and exhaust passage way 26 are in communication with the combustion chamber though a valve seat 30. A poppet 32 is located at each valve seat 30 for selectively opening its respective passageway to the combustion chamber, or closing the same.

Illustrated in FIG. 2 are one of the intake valves 12A and one of the exhaust valves 12B, which are capable of operating their respective poppets 32 to selectively open and close the intake passageway 24 and exhaust passageway 26 to the combustion chamber. In FIG. 2, the poppet 32 for the intake valve 12A is open, and the poppet 32 for the exhaust valve 12B is closed.

With respect to the particular structure of the valves 12, the most apparent feature is the absence of any cam structure. Each of the valves 12 is independently operable by electrical, hydraulic, or pneumatic means. In the embodiment illustrated in FIG. 2, the valves 12 are electrically operated.

FIG. 2 illustrates one example of an electrically operated valve suitable for the poly valve system of the present invention. The valve 12 includes a T-cap 40 attached to the poppet 32 by a valve stem 42. The T-cap 40 has a flange 41 which is fully opposite the poppet 32 and a barrel 44 extending from the T-cap 40 toward the poppet 32 and coaxial with the valve stem 42. At least a portion of the flange 41 is made of a ferrous metal. The valve includes a solenoid 50 located between the poppet 32 and the T-cap 40. A limit sleeve 46 is mounted between the cylinder head 22 and the T-cap 40, the valve stem 42 extending through the limit sleeve 46, for limiting the downward travel of the poppet. The limit sleeve 46 stops downward travel of the poppet 32 when the barrel 44 of the T-cap 40 reaches the limit sleeve 46.

The solenoid 50 comprises a solenoid coil 52 mounted on a spindle 54 coaxial with the valve stem 42. When the solenoid coil 52 is energized, the flange 41 of the T-cap 40 is attracted toward the spindle 52, moving the valve stem 42 and thus the poppet downward, opening the valve.

A spring means is provided between the cylinder head and T-cap 40 for biasing the T-cap away from the cylinder head, and thus for biasing the poppet in the closed position. The spring means acts to return the poppet to its valve seat and close the valve immediately after power is removed from the solenoid coil.

In FIG. 2, the spring means is an elastomeric housing 60 which also acts as an enclosure for the solenoid 50. The elastomeric housing 60 is cylindrical, is coaxial with the valve stem 42, and has two housing ends 62. One of the housing ends 62 extends against the flange 41 of the T-cap 40, and the outer housing end 62 extends against the cylinder head. The cylinder head has a valve recess 27 within which said housing end 62 is mounted and is stabilized thereby.

In FIG. 2, the intake valve 12A is shown in the open position, while the exhaust valve 12B is shown in the closed position. As illustrated, the elastomeric housing 60 has buckled as the intake valve 12A opened. When the solenoid coil is de-energized, the elastomeric housing 60 "pops back", closing the valve, as shown by the exhaust valve 12B.

Figure 3:
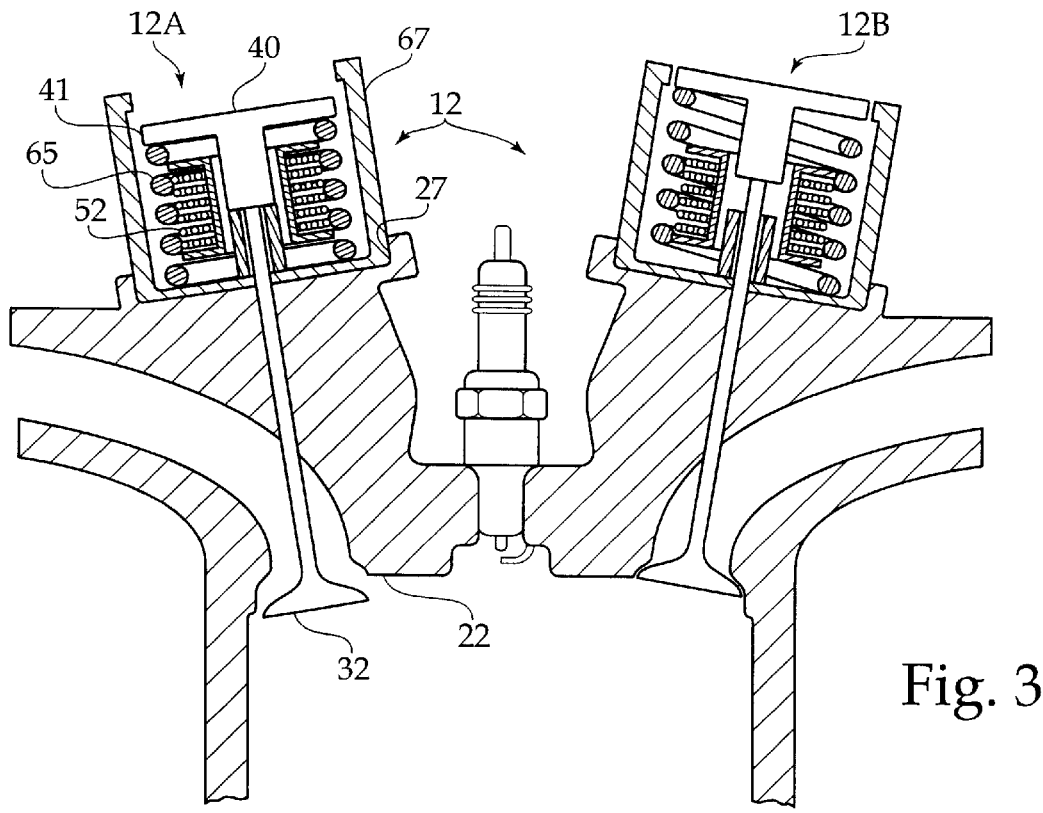
FIG. 3 is a cross sectional view of a cylinder having a simplified topology wherein similar to FIG. 2, except wherein the valves are of an electrically operated embodiment of the invention which uses a coil spring to restore the valve to the closed position.

FIG. 3 illustrates another embodiment of the valve 12, wherein the spring means is a coil spring 65 mounted between the T-cap 40 and the cylinder head 22. The coil spring 65 and the solenoid are preferably contained within a rigid housing 67 which is mounted in the valve recess 27. Once again, in FIG. 3, the intake valve 12A is shown in the open position while the exhaust valve 12B is shown in the closed position. As in the embodiment of FIG. 2, the valve 12 operates by attracting the T-cap flange 41 toward the solenoid coil 52 to open the valve, and then the valve is closed by de-energizing the solenoid coil 52 and allowing the coil spring 65 to return poppet 32 to the closed position.

Figure 4:
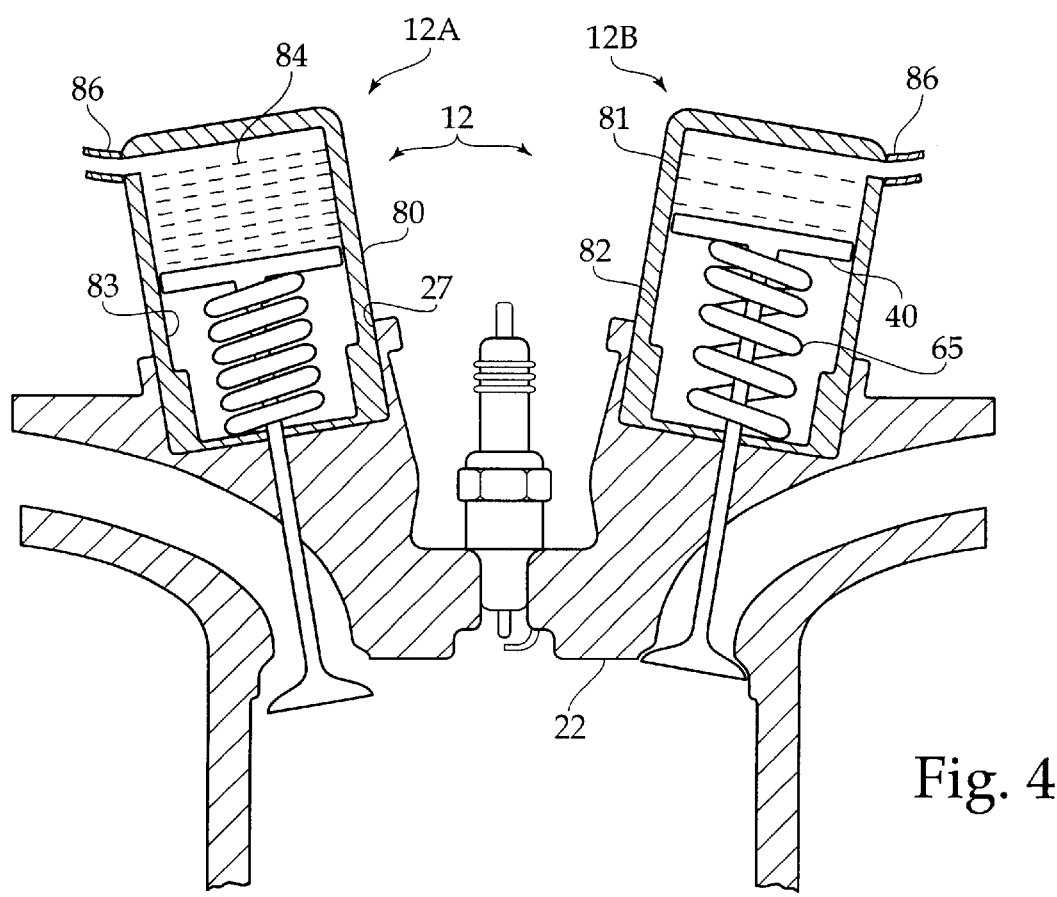
FIG. 4 is a cross sectional view of a cylinder having a simplified topology, wherein the valves are hydraulically or pneumatically operated.

FIG. 4 illustrates a further embodiment of the invention, in which the valves 12 are hydraulically or pneumatically operated using a fluid medium. "Fluid" as used herein, can refer to either a liquid or gas medium suitable for use in transfering mechanical energy. The valves 12 comprise a sealed housing 80 which is mounted within the valve recess 27 of the cylinder head. The sealed housing 80 has smooth inner walls 83, an upper portion 81 and a lower portion 82. The T-cap 40 is sized to fit tightly within the sealed housing 80 so that it can move upward and downward within the sealed housing 80, toward and away from the cylinder head 22, while maintaining a close fit with the inner walls 83. The coil spring is mounted between the T-cap 40 and the lower portion 82 of the sealed housing 80 The upper portion is in fluid communication with a control line 86. Fluid 84 is present in the upper portion 81 above the T-cap 40. When the fluid 84 in the upper portion 81 is pressurized by means of the control line 86, the T-cap 40 is pushed downward and thus the valve is opened, as shown by the intake valve 12A. When pressure in the upper portion 81 is released by releasing pressure in the control line 86, the coil spring 65 returns the poppet to its valve seat, closing the valve, as illustrated in FIG. 4 by the exhaust valve 12B.

Regardless of the particular valve configuration used, all valves are operated under the control of a central control unit. Since the valves are each individually operable operation of the engine, valve timing and opening duration may be completely determined by said control unit. In the case of the electrically operated valves, a buffered or amplified signal from a microcontroller is all that is necessary to actuate the valves. When pneumatic or hydraulic valves are used, an intermediary system is necessary to pressurize and evacuate the control lines at appropriate times under the direction of the control unit. Nevertheless, whether pneumatic or hydraulic lines are used for the control line, or an electrical connection is made to the solenoid, such control connections communicate what may be referred to as a control signal. The term control signal is appropriate because it is the mere presence of the signal that causes the valve to operate, and not the position of any other engine components. In other words, the valve can even be made to operate at a completely inappropriate time, such as during the compression or combustion strokes, if so desired.

Because the valves are not mechanically linked to the rotation of the crankshaft, they are fully independently operable, the various intake valves for each cylinder may be operated independently. Thus, the staggered opening of the various intake valves may be used to create a turbulent "swirl" during the intake stroke. Empirical study can determine the most effective opening order, opening times, and opening duration for the valves, and can determine variations for different engine speeds. The control unit can then be programmed with this data, and operate the valves accordingly. With the flexible valves arrangement of the present invention, similar study could conceivably be used to determine if varying the exhaust valve opening order has an bearing on the ability of the engine to evacuate the combustion chamber of exhaust gases during the exhaust stroke. In addition, valve placement on the cylinder head has greater flexibility when compared to cam operated valve systems. Thus, the valve placement can be optimized through empirical experimentation to maximize the swirl effect, air flow, and thus engine performance.

Thus, the foregoing description presents a poly valve system which improves engine performance by providing multiple, independently operable valves per cylinder. The engine configuration disclosed herein provides a platform for experimentation to determine valve order, opening timing, and opening duration to maximize engine performance. In addition, the independent valve operation allows implementation of non-parallel valves, which is discussed in conjunction with FIGS. 5–15, as follows.

Figure 5:
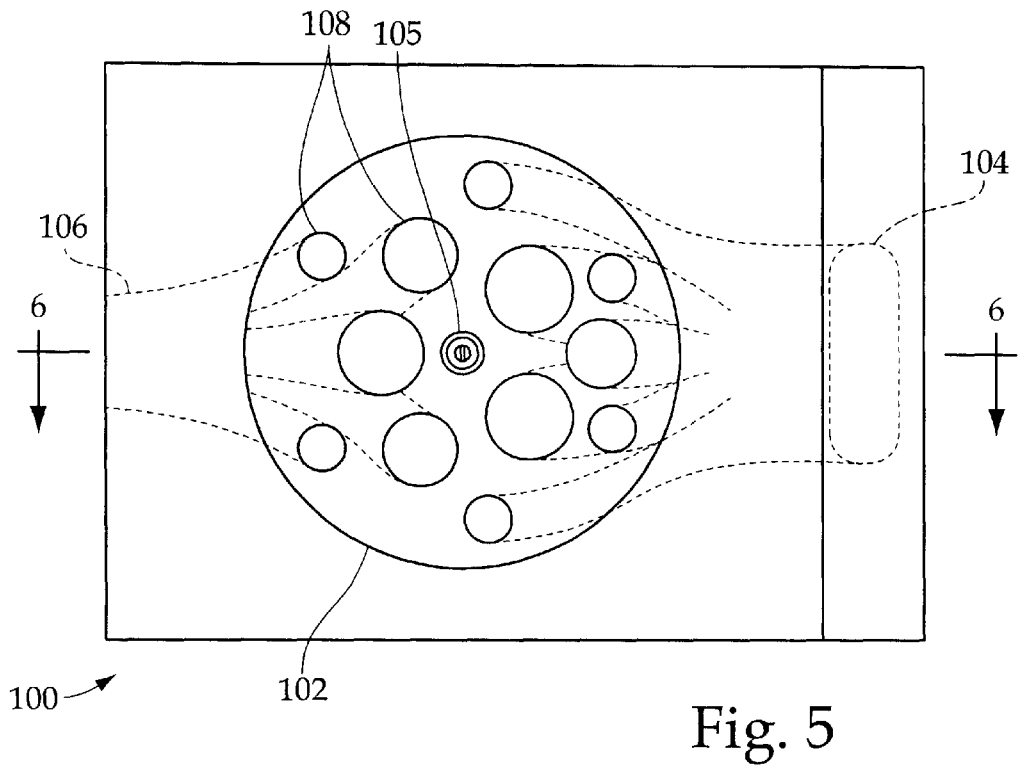
FIG. 5 is a bottom plan view of a cylinder head having a hemispherical roof, wherein valve placement is made to take advantage of the non-parallel valve placement made possible by the independent valve opening technology disclosed in FIG. 1 through FIG. 4.

FIG. 5 is a bottom plan view of a cylinder head 100, having a hemispherical cylinder head roof 102. An intake manifold 104 and an exhaust manifold 106 extend through the cylinder head 100. A spark plug 105 is centered within the hemispherical cylinder head roof 102. A cylinder center line extends ortogonally from this drawing figure at the spark plug 105. A plurality of valve openings 108, representing intake valves and exhaust valves, penetrate the hemispherical cylinder head roof 102 surrounding the spark plug 105. In general, the intake valves are grouped toward the intake manifold 104 and the exhaust valves are grouped toward the exhaust manifold 106. The intake valves are each distinctly indicated by the letters "A" through "G". One of the exhaust valves is labeled with the letter "H". All of these valve openings 108 are substantially tangential to the surface of the hemispherical cylinder head roof 102, and thus, all are oriented toward the cylinder center line.

Depicting the various channels, bores, and passageways within the cylinder head 100 is extremely difficult, since they exist in three dimensions, within a substantially solid cylinder head 100. All of these channels are bored from, cast or forged within a substantially solid piece of material. Accordingly, the remaining drawing figures are an attempt at showing as clearly as possible that the various intake valves are not parallel to each other—that they form an angle both with each other, with the horizontal plane, and with both vertical planes. Thus, they are generally not "upright" with respect to the cylinder. They are oriented toward the cylinder center line. The axis of each valve might be radial, where they are oriented toward the true center of the imaginary sphere partially formed by the hemispherical cylinder head roof, or the axis of the valve is a "radiant", where it is oriented toward some point substantially along the cylinder center line. Having multiple intake valves and multiple exhaust valves allows volumetric efficiency to be maximized. Having these multiple valves in a hemispherical chamber allows thermal efficiency to be maximized. Thus, according to the present invention, both thermal and volumetric efficiency are achieved. This non-parallel arrangement of valves is made possible by the independent valve operation technology disclosed herein supra.

Figure 6:
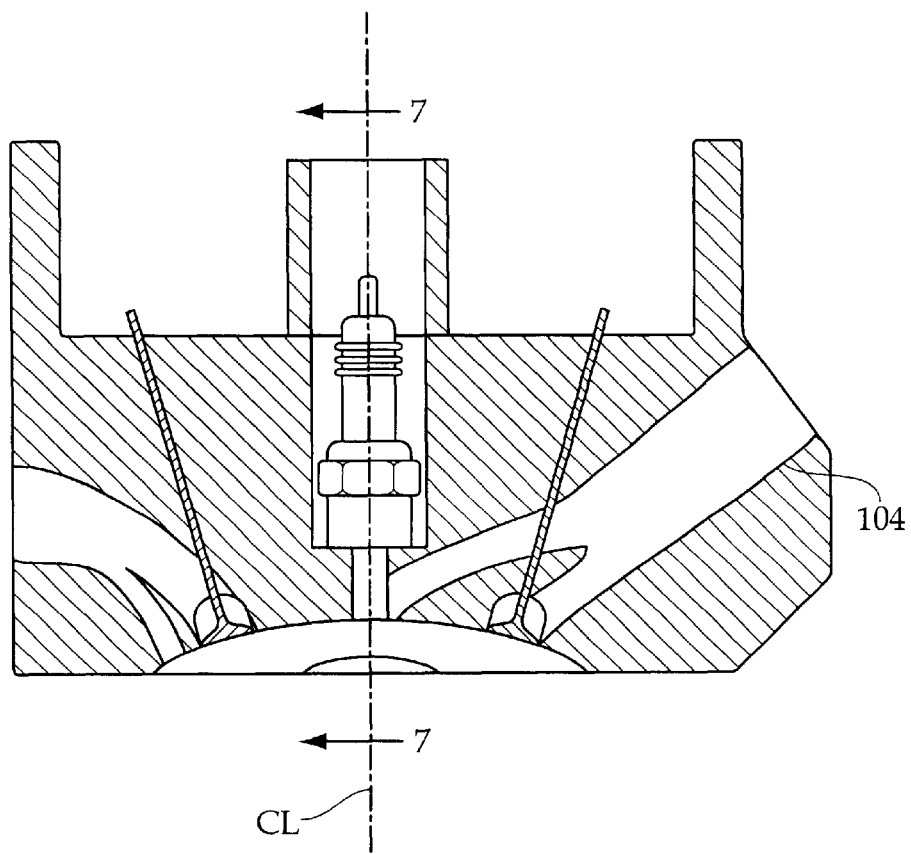
FIG. 6 is a diagrammatic cross sectional view, taken generally in the direction of arrow 6—6 in FIG. 5, but inverted "upside-down," to provide a basis to show additional orthogonal sectional views which illustrate the non-parallel arrangement of the valves of FIG. 5, an exhaust and an intake valve are seen, with the valve opening technology omitted from the valve stem for clarity.

FIG. 6 is a cross sectional view, taken generally in the area indicated by line 6—6 in FIG. 5. It shows one of the exhaust valves H, and one of the intake valves F, wherein the axis of each valve is directed toward the cylinder center line CL. The intake manifold 104 and exhaust manifold 106 are partially visible in FIG. 6. FIG. 6 is substantially duplicated in FIG. 8, FIG. 10, FIG. 12, and FIG. 14, which each provide the basis and cutting plane lines for the orthogonal sections of FIG. 7, FIG. 9, FIG. 11, FIG. 13, and FIG. 15, respectively, since these cutting plane lines are not vertical, but extend at an increasing angle to the cylinder center line CL as they move away from the cylinder center line CL.

Figure 7:
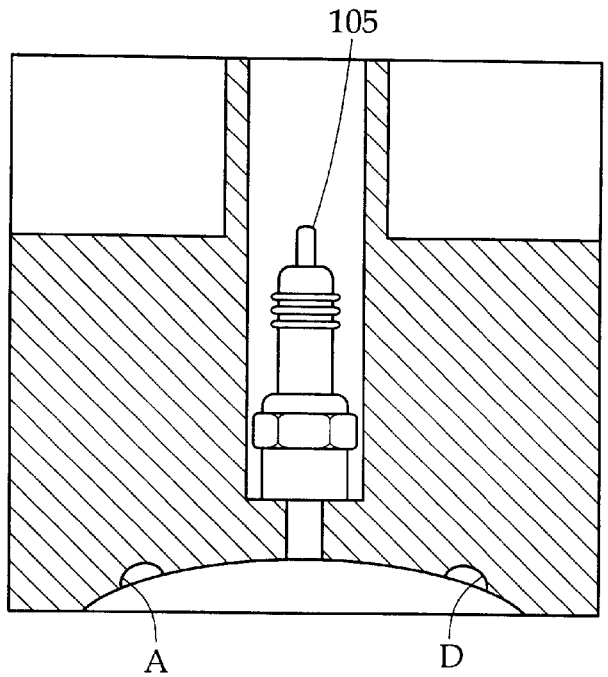
FIG. 7 is a diagrammatic cross sectional view, taken generally in the area of arrow 7—7 in FIG. 6, the section being taken substantially vertically through the cylinder head—the spark plug located at the center of the cylinder head is illustrated.
Figure 8:
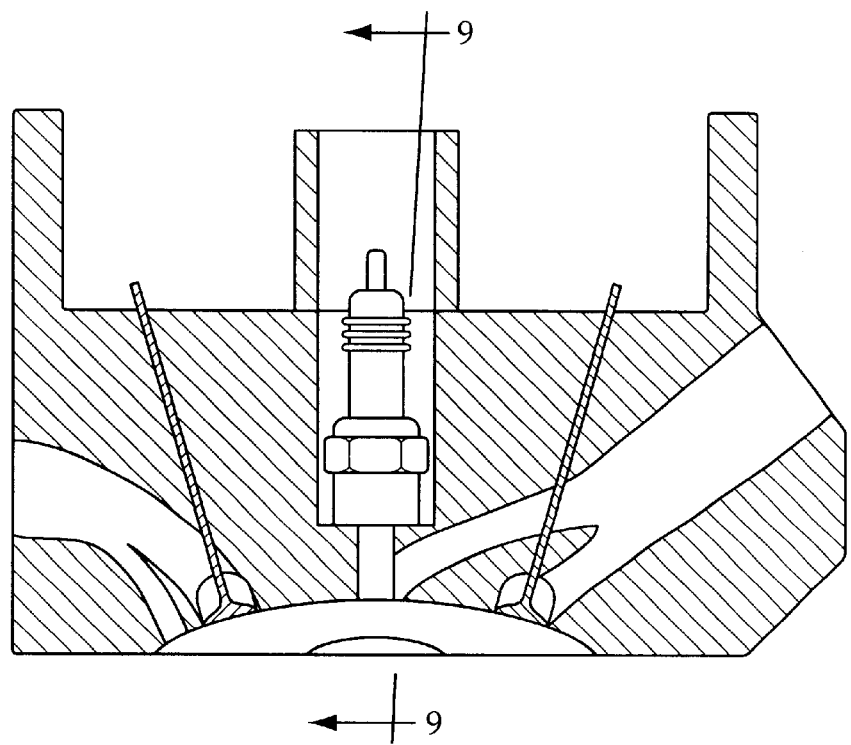
FIG. 8 is a diagrammatic cross sectional view, similar to FIG. 6.

FIG. 7 is a section view taken vertically through the cylinder center line, fully orthogonal to FIG. 6. Thus, the spark plug is visible, as are a small portion of valve openings A and D.

Figure 9:
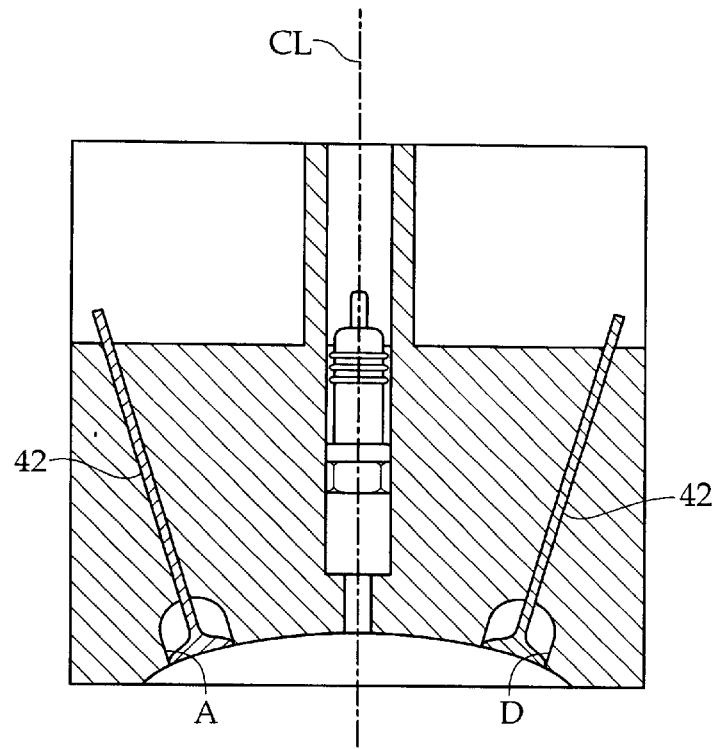
FIG. 9 is a diagrammatic cross sectional view, taken generally in the area of line 9—9 in FIG. 8, wherein two valve stems of two intake valves become visible, which are non-parallel and oriented toward the chamber center line.
Figure 10:
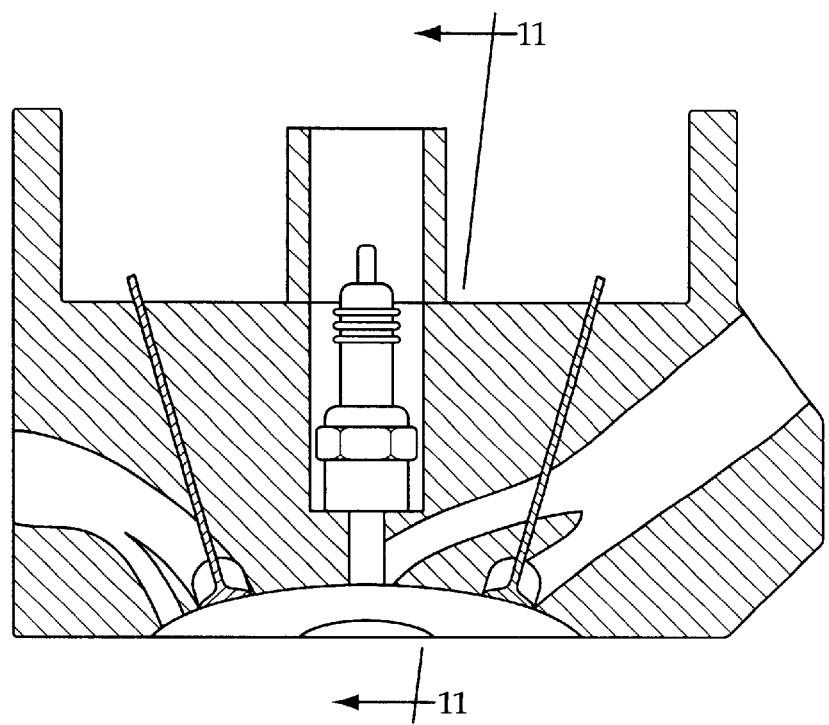
FIG. 10 is a diagrammatic cross sectional view, similar to FIG. 6 and FIG. 8.

FIG. 9 is a section view taken at an increasing angle from the cylinder center line CL, accordingly both valves A and D are visible in a non-foreshortened manner. Both valves A and D are non-parallel and are oriented toward the cylinder center line CL, such that their valve stems 42 are axially oriented toward the cylinder center line CL.

Figure 11:
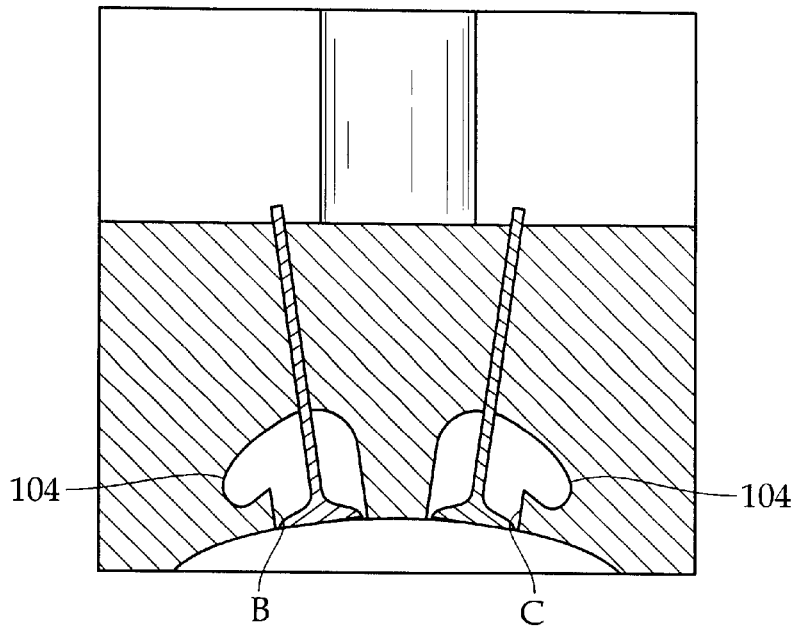
FIG. 11 is a diagrammatic cross sectional view, taken generally in the area of line 11—11 in FIG. 10, wherein another two non-parallel intake valves are visible, as are portion of the intake manifold.
Figure 12:
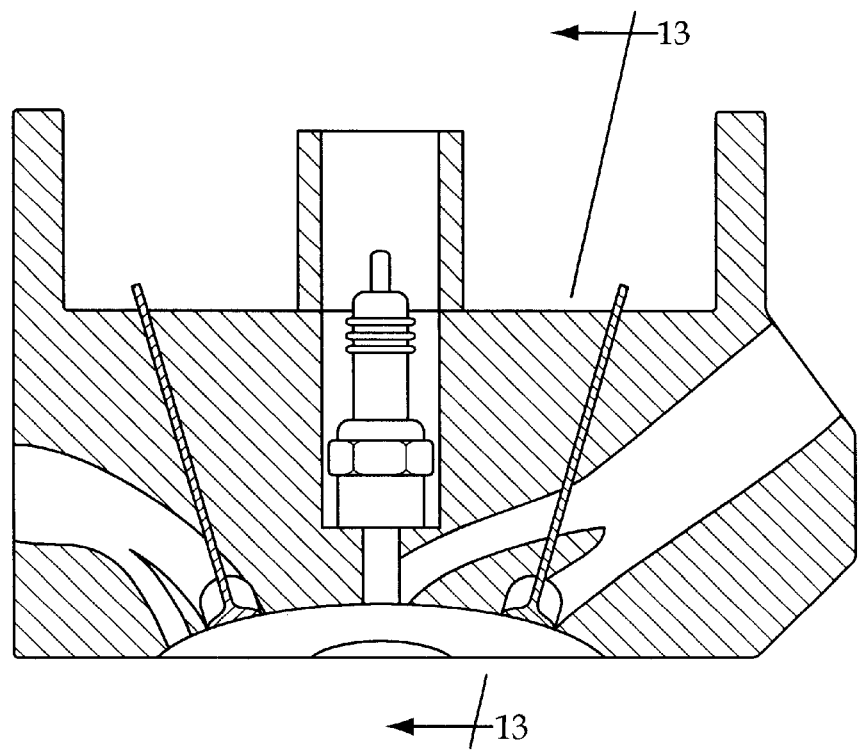
FIG. 12 is a diagrammatic cross sectional view, similar to FIG. 6, FIG. 8, and FIG. 10.

FIG. 11 is a section view taken at a further increasing angle from the cylinder center line CL, showing valves B and C in a non-foreshortened manner. Intake valves B and C are non-parallel and are oriented toward the cylinder center line CL. A portion of the intake manifold 104 is visible adjacent to valves B and C.

Figure 13:
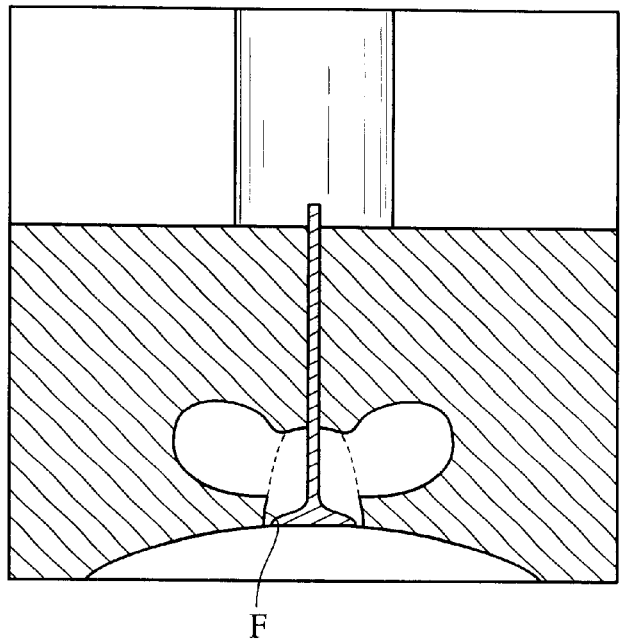
FIG. 13 is a diagrammatic cross sectional view, taken generally in the area indicated by line 13—13 in FIG. 12, wherein one of the intake valves is shown, as well as portions of the intake manifold connected therewith.
Figure 14:
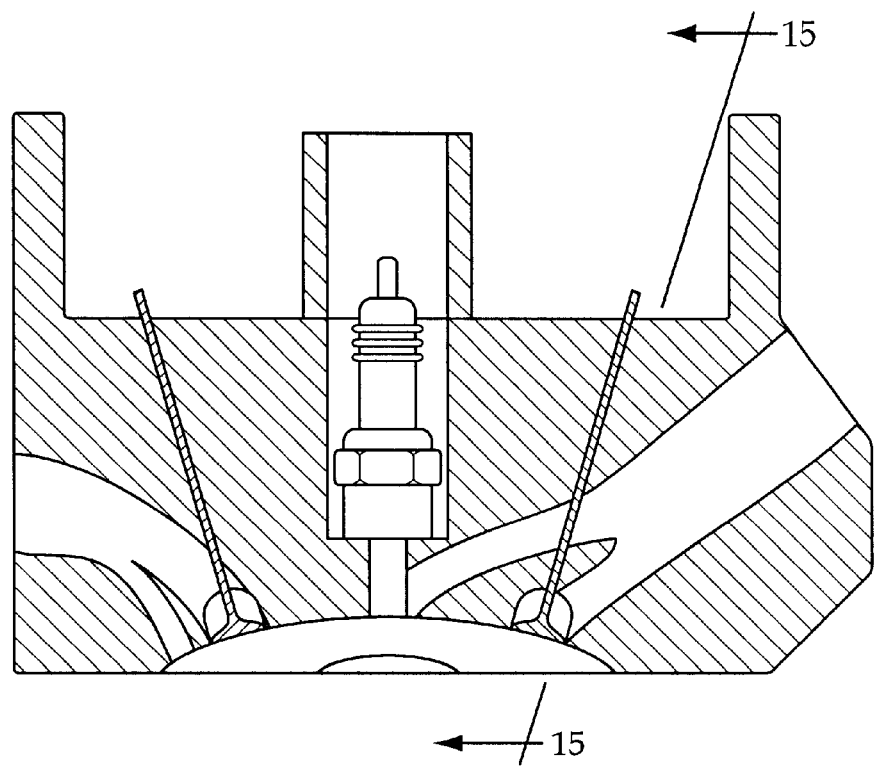
FIG. 14 is a diagrammatic cross sectional view, similar to FIG. 6, FIG. 8, FIG. 10, and FIG. 12.

FIG. 13, is a sectional view taken at a still further increasing angle from the cylinder center line CL, which simply illustrates intake valve F in a non-foreshortened manner.

Figure 15:
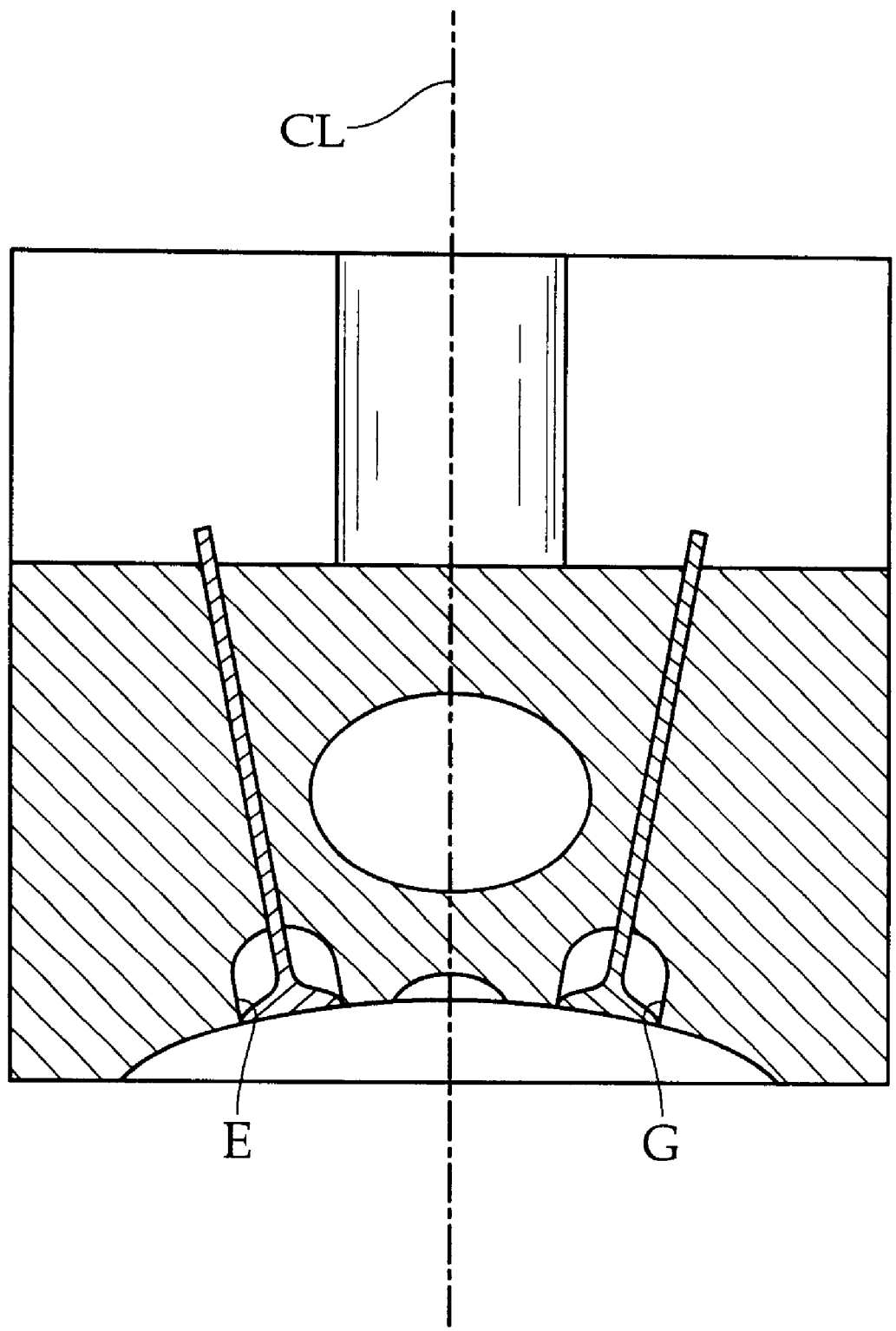
FIG. 15 is a diagrammatic cross sectional view, taken generally in the area of indicated by line 15—15 of FIG. 14, illustrating two additional intake valves in a non-parallel arrangement.

FIG. 15 is a sectional view taken at yet a further increasing angle from the cylinder center line CL, illustrating intake valves E and G in a non-foreshortened manner. Intake valves E and G are non-parallel and are oriented toward the cylinder center line CL. Valve opening F is partially seen in FIG. 15.

The various views depicted by FIGS. 6 through 15 show that none of the illustrated valves are parallel to any one of the others. In fact they axially vary in angle in both "pitch" and "yaw". Their angle is varied so that they are directed axially toward the cylinder center line. This configuration allows thermal efficiency to be maximized. However, this configuration is only made possible by the independent valve operation technology presented herein.

What is claimed is:

1. A valve system for an internal combustion engine comprising at least one cylinder defining a bore for receiving a piston having a cylinder center line, a cylinder head adjacent to said bore, a combustion chamber defined within the bore between the piston and cylinder head having a substantially hemispherical roof having valve seats, an intake manifold and an exhaust manifold, the valve seats in the roof of the cylinder head each provide communication between the combustion chamber and one of the exhaust manifold and intake manifold, comprising:

at least five intake valves associated with the cylinder for selectively controlling communication between the intake manifold and the combustion chamber, the valves each have a poppet located in one of the valve seats for selectively opening and closing communication between the intake manifold and conbustion chamber through said valve seat, each valve is independently opereated by a control signal, at least three of the intake valves are axially non-parallel to each other and at least five intake valves are axially oriented toward the cylinder center line.

2. The valve system as recited in claim 1, wherein each valve comprises a sealed housing having inner walls, an upper portion, and a lower portion, the valve has a valve stem attached to the poppet and a T-cap fully opposite the valve stem, the T-cap is mounted within the housing so that it is capable of movement toward and away from the cylinder head while keeping a tight seal against the inner walls, a control line selectively provides pressurized fluid to the upper portion to press downward upon the T-cap to push the poppet away from the valve seat to open the valve.

3. The valve system as recited in claim 1, wherein each valve has a valve stem attached to the poppet and each valve further comprises a solenoid for selectively pushing the poppet out of its valve seat and toward the combustion chamber to open said valve.

4. The valve system as recited in claim 3, wherein each valve further comprises a T-cap attached onto the valve stem fully opposite the poppet, the T-cap is made of a ferrous metal, and the solenoid comprises a solenoid coil mounted between the poppet and the T-cap, the solenoid coil coaxial with the valve stem, wherein the T-cap is attracted to the solenoid coil when the solenoid coil is energized to displace the poppet from the valve seat to open the valve.

5. The valve system as recited in claim 4, wherein each T-cap comprises a flange and a barrel portion, the barrel portion coaxial with the valve stem, the valve further having a limit sleeve mounted between the cylinder head and the T-cap, the valve stem extending through the limit sleeve for limiting the downward travel of the poppet when the barrel reaches the limit sleeve.

6. The valve system as recited in claim 1, further comprising a plurality of exhaust valves associated with each cylinder which each control communication between the exhaust manifold and the combustion chamber, wherein each of the exhaust valves is independently operable.

7. The valve system as recited in claim 6, wherein at least three exhaust valves are present at each cylinder.

8. The valve system as recited in claim 5, wherein the cylinder head has a valve recess within which the valve is mounted.

9. The valve system as recited in claim 8, wherein each valve has a coil spring mounted between the cylinder head and the T-cap for biasing its poppet against its valve seat.

10. The valve system as recited in claim 8, wherein each valve further has an elastomeric housing mounted within the valve recess, encasing the solenoid, the flange of the T-cap located outside of the elastomeric housing, so that when the solenoid is energized the T-cap causes the elastomeric housing to temporarily buckle, and when the solenoid is de-energized the elastomeric housing pops back to restore its poppet against its valve seat.

11. The valve system as recited in claim 9, wherein each valve further comprises a coil spring mounted between the T-cap and the cylinder head for biasing the poppet against the valve seat.

* * * * *